US012678804B2

(12) United States Patent
Wallart

(10) Patent No.: US 12,678,804 B2
(45) Date of Patent: Jul. 14, 2026

(54) DEVICE FOR SEPARATING AND RECOVERING BLOOD FRACTIONS

(71) Applicant: CELLQUEST, Marchaux-Chaudefontaine (FR)

(72) Inventor: Guillaume Wallart, Mesandans (FR)

(73) Assignee: CELLQUEST, Marchaux-Chaudefontaine (FR)

( * ) Notice: Subject to any disclaimer, the term of this patent is extended or adjusted under 35 U.S.C. 154(b) by 739 days.

(21) Appl. No.: 17/999,311

(22) PCT Filed: May 20, 2021

(86) PCT No.: PCT/FR2021/050896
§ 371 (c)(1),
(2) Date: Nov. 18, 2022

(87) PCT Pub. No.: WO2021/234298
PCT Pub. Date: Nov. 25, 2021

(65) Prior Publication Data

US 2023/0182150 A1 Jun. 15, 2023

(30) Foreign Application Priority Data

May 20, 2020 (FR) ...................................... 2005199

(51) Int. Cl.
*B04B 5/04* (2006.01)
*B04B 13/00* (2006.01)

(52) U.S. Cl.
CPC ............ *B04B 5/0407* (2013.01); *B04B 13/00* (2013.01)

(58) Field of Classification Search
CPC ................... B04B 5/0407; B04B 13/00; B01L 2300/0851; B01L 2300/0858; B01L 2400/0409; B01L 2400/0622; B01L 3/5021; A61M 1/029; A61M 1/3698; A61M 2202/0427; A61M 1/3696
See application file for complete search history.

(56) References Cited

U.S. PATENT DOCUMENTS 3,911,918 A 10/1975 Turner
2016/0129438 A1 5/2016 Hassouneh et al.

FOREIGN PATENT DOCUMENTS

KR 101125073 B1 * 3/2012 .......... A61M 1/3693
TW 201405127 A 2/2014

OTHER PUBLICATIONS

Bang (KR101125073B1) English translation (Year: 2025).*
International Search Report for International Application No. PCT/FR2021/050896 dated Sep. 23, 2021, 2 pages.
International Written Opinion for International Application No. PCT/FR2021/050896 dated Sep. 23, 2021, 5 pages.

* cited by examiner

*Primary Examiner* — Jennifer Wecker
*Assistant Examiner* — Jonathan Bortoli
(74) *Attorney, Agent, or Firm* — TraskBritt

(57) ABSTRACT

A device for separating and recovering blood fractions includes two conical chambers communicating via their bases, the first chamber having a duct for supplying the fluid to be treated and means for recovering at least one component, the second chamber comprising an elastically deformable flexible membrane that transversely separates a space opening into the duct for communicating with the second chamber, and a bag having a volume that varies according to the deformation of the membrane.

7 Claims, 6 Drawing Sheets

[Fig. 1]
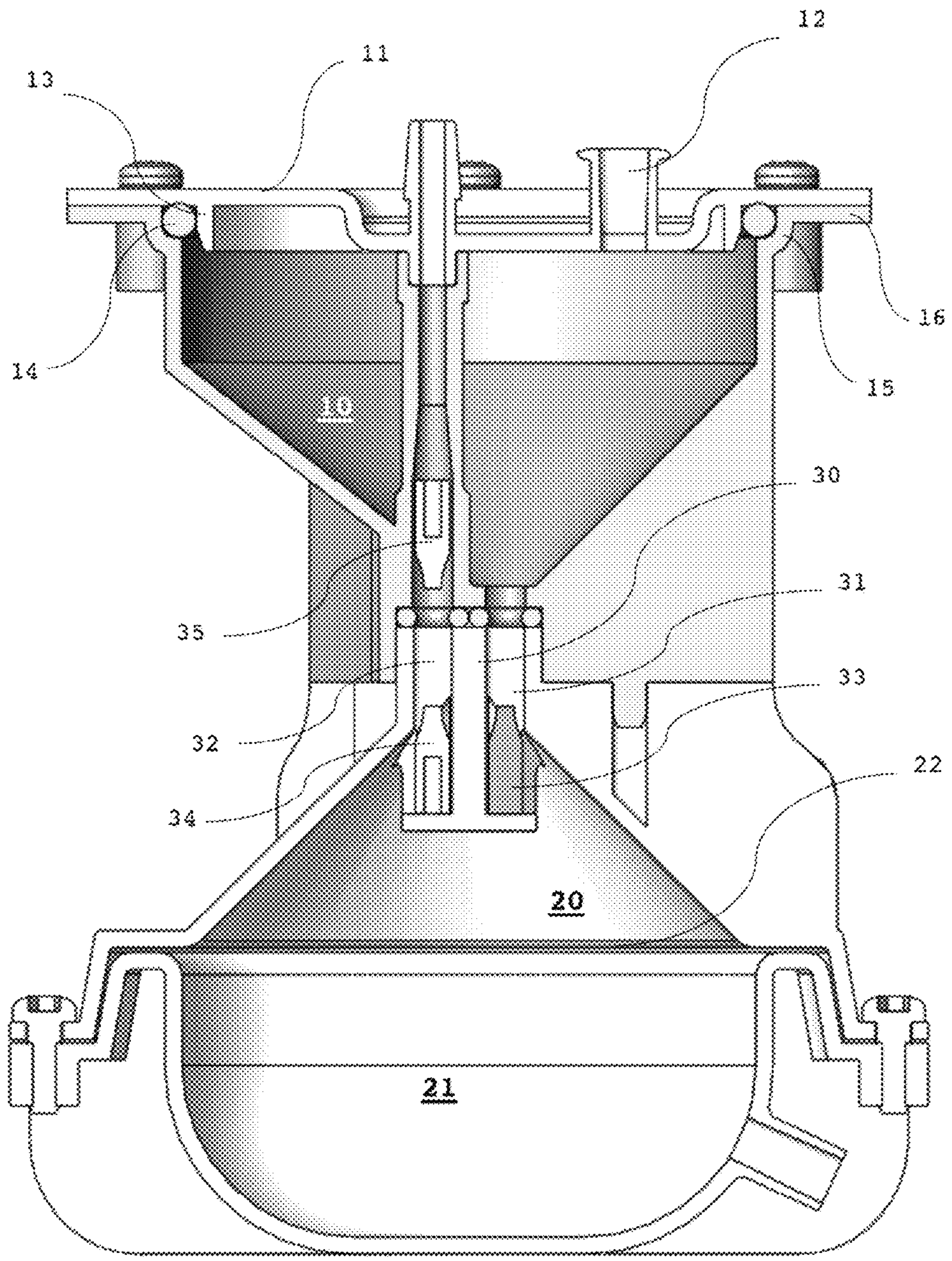

[Fig. 2]
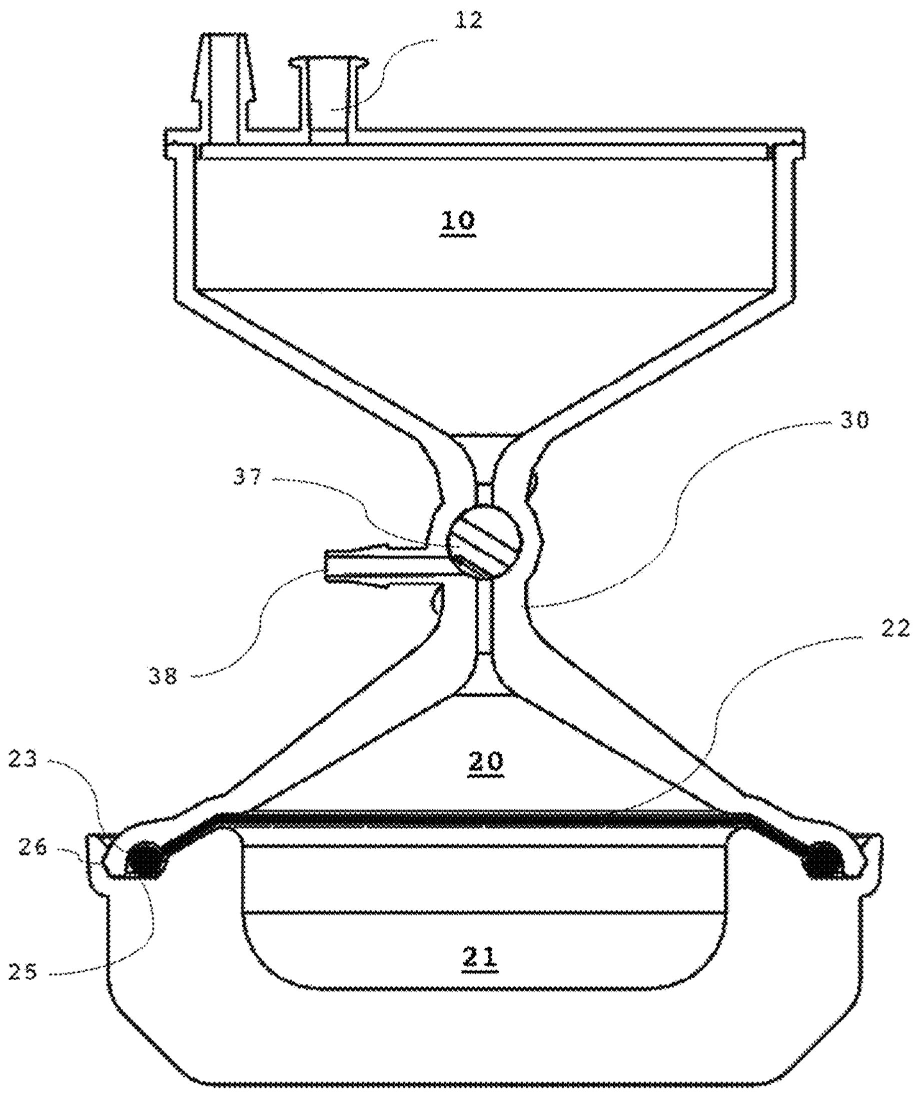

[Fig. 3]
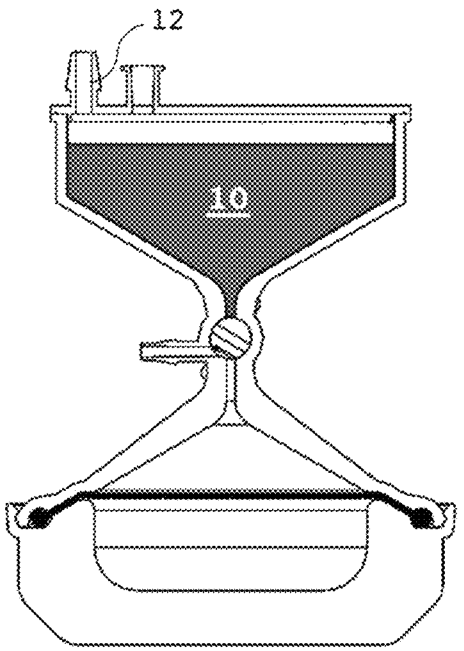
[Fig. 4]
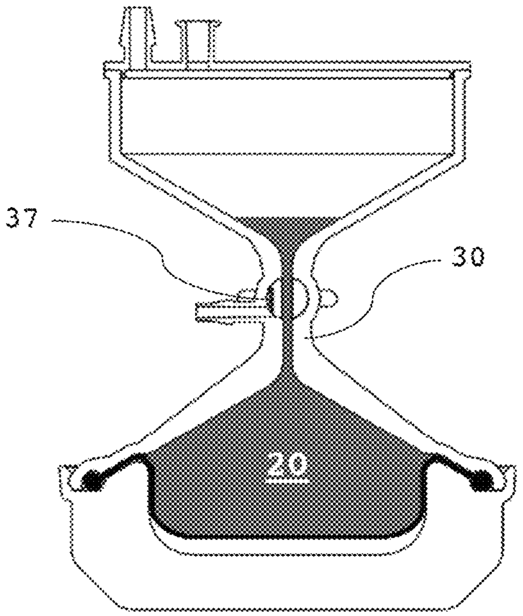

[Fig. 5]
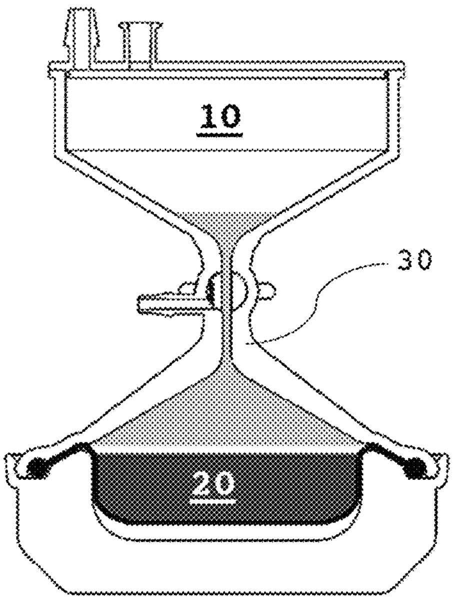
[Fig. 6]
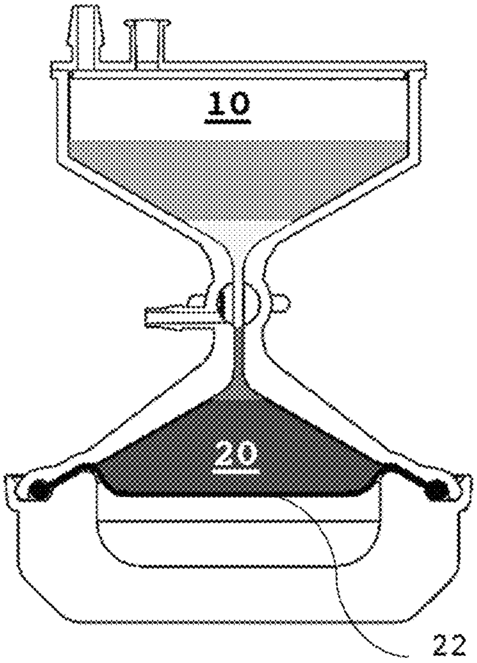

[Fig.7]
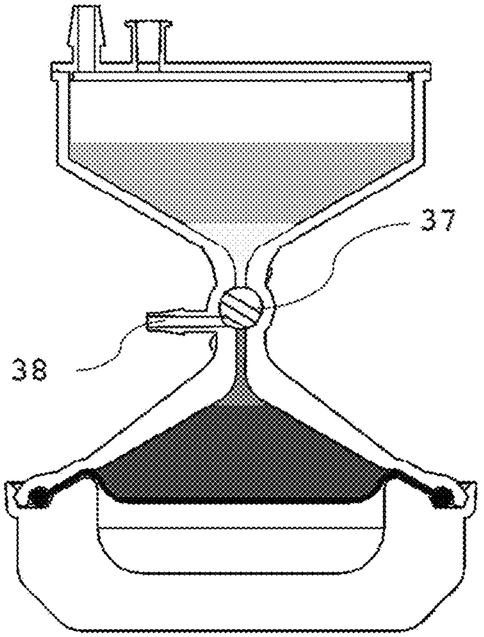
[Fig. 8]
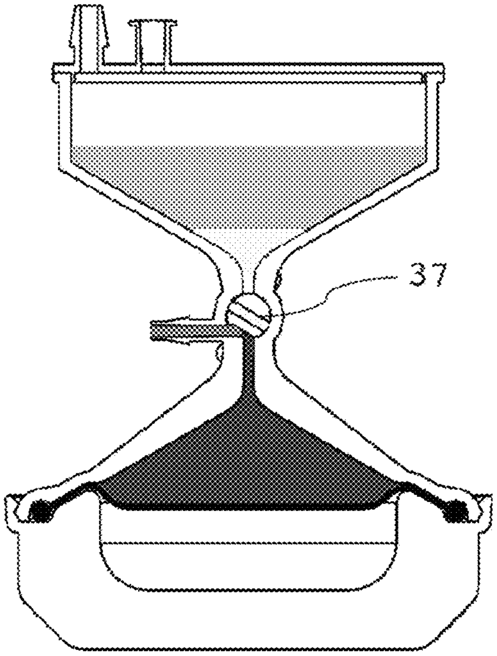

[Fig. 9]
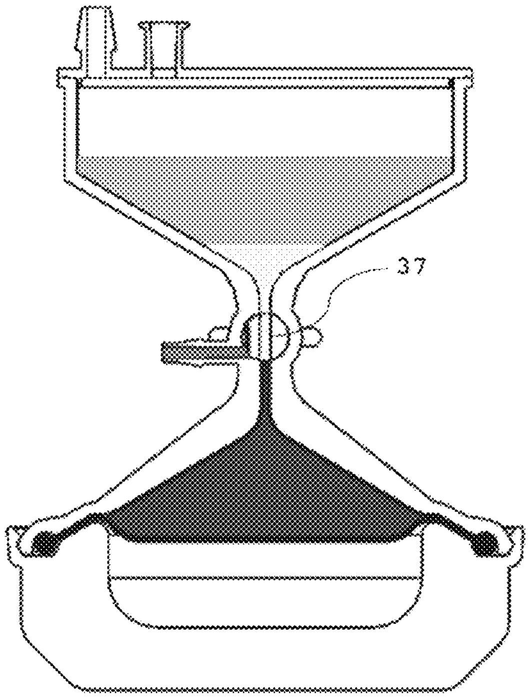

DEVICE FOR SEPARATING AND RECOVERING BLOOD FRACTIONS

CROSS-REFERENCE TO RELATED APPLICATIONS

This application is a national phase entry under 35 U.S.C. § 371 of International Patent Application PCT/FR2021/050896, filed May 20, 2021, designating the United States of America and published as International Patent Publication WO 2021/234298 A1 on Nov. 25, 2021, which claims the benefit under Article 8 of the Patent Cooperation Treaty to French Patent Application Serial No. FR2005199, filed May 20, 2020.

TECHNICAL FIELD

The present disclosure relates to the automated treatment and separation of biological cells such as those found in whole blood, and relates more specifically to a closed functional system that makes it possible to extract some populations of cells such as the hematopoietic stem cells, for immediate use or mixing with an additive solution or a storage solution for subsequent separated storage operations and for processes that make it possible to perform an extraction of this kind. The aim is, in particular, to automate the isolation of buffy coat having a large number of hematopoietic stem cells and mesenchymal stem cells.

It relates more particularly to the field of separating and recovering blood fractions by centrifugation, in particular, the lymphocytes and other white cells.

In particular, this separation from a sample of blood can be achieved by forming a density gradient in a centrifuge tube, above a layer of a fluid of a reference density, for example, liquid polyfluorocarbon (FICOLL®) of density 1.077.

BACKGROUND

One of the applications that is very widespread, in particular, in Asia, relates to cosmetic surgery, for the preparation of platelet-rich plasma (PRP), using an hourglass-shaped tube and two openings, subjected to centrifugation. The buffy coat is then collected in the region of the tube neck.

The PRP is centrifuged in order to eliminate the red blood cells and to separate the blood platelets and the platelet-rich growth factor (buffy coat) rich in platelets and in growth factors. In the field of surgery, the PRP has the function of reconstructing and repairing the damaged parts of blood vessels. It is possible to concentrate the growth factors that promote the cutaneous or tissue, or reconstructive, regeneration (living ligaments, tendons) for the treatment of arthritis, chronic back pain, pelvic pain, and lesions of shoulder and knee ligaments.

The consumables are present in the form of a double cone, connected by their bases, and one of which comprises, on the outer face thereof, a well provided for supply with the collected blood. The amount of plasma desired for subsequently collecting the growth factors present in the alpha granules of the platelets, such as TGF-β ("transforming growth factor beta"), VEGF ("vascular endothelial growth factor"), and PDGF ("platelet-derived growth factor"), are collected via this same opening, after centrifugation.

In the prior art, U.S. Patent Application Publication No. US20160129438 is known, which describes a cup for collecting biological liquid that can be used with a centrifuge for separating a biological liquid into its constituent elements. The cup is in the shape of an hourglass, having flared upper and lower parts and a narrowed central part. A piston is inserted, by sliding, into the lower part, and a lateral aperture is provided for extracting a liquid from the narrowed part.

Taiwan Patent Application Publication No. TW201405127A is also known, which describes a structure comprising a plurality of bodies. One of the bodies comprises a first receiving compartment having a fixed volume, and a second compartment having a variable volume, which compartments are connected by a narrowing that defines a communication path for establishing communication between the fixed-volume compartment and the variable-volume compartment.

Furthermore, U.S. Pat. No. 3,911,918 is known, which describes a receptacle for storing a viable fluid, such as blood, made of a flexible plastic material that is formed in one piece and has two storage compartments that are connected in fluid communication by a neck part of the transfer duct. One of the storage compartments is of a size intended for containing approximately 60% of a predetermined amount of blood with the other storage compartment and the neck part of the transfer duct, the size of which is intended for containing the rest of the predetermined amount of blood. The neck part of the transfer duct is made of a material that can be sealed such that the container can be divided into a certain number of separated independent compartments, and in another use of the container.

BRIEF SUMMARY

The present disclosure relates, according to its most general meaning, to a device for separating and recovering blood fractions by means of two conical chambers communicating via their bases, the first chamber having a duct for supplying the fluid to be treated, and means for recovering at least one component, characterized in that the second chamber comprises an elastically deformable flexible membrane that transversely separates a space opening into the duct for communicating with the second chamber, and a bag having a volume that varies according to the deformation of the membrane.

Advantageously, the recovery means comprises at least one float that is of a determined density and is positioned in a channel formed in the interface between the conical chambers.

According to a variant, the recovery means comprises a three-way valve that is positioned in a channel formed in the interface between the conical chambers, comprising an outlet nozzle.

The disclosure also relates to equipment for separating and recovering blood fractions formed by a centrifuge having a plate, wherein the plate has at least one recess for a device mentioned above.

Preferably, the plate comprises at least one recess for a device mentioned above, and comprises an image sensor, the field of vision of which corresponds to a passage zone during the rotation of the segment for communicating between the chambers and a part at least adjacent to each of the two chambers, the plate comprising a means for controlling the position of the valve of the device deposited on the plate.

Advantageously, it further comprises a computer that controls the control means depending on the development of images acquired by the image sensor.

BRIEF DESCRIPTION OF THE DRAWINGS

The present disclosure will be more clearly understood upon reading the following description, which refers to the accompanying drawings and relates to a non-limiting embodiment of the disclosure, in which drawings:

FIG. 1 is a longitudinal cross-sectional view of a device according to an embodiment of the disclosure;

FIG. 2 is a longitudinal cross-sectional view of a variant of the device according to an embodiment of the disclosure comprising a three-way valve;

FIG. 3 is a longitudinal cross-sectional view of the variant comprising a three-way valve at the blood-charging step;

FIG. 4 is a longitudinal cross-sectional view of the variant comprising a three-way valve at the centrifugation step;

FIG. 5 is a longitudinal cross-sectional view of the variant comprising a three-way valve at the separating step;

FIG. 6 is a longitudinal cross-sectional view of the variant comprising a three-way valve at the deceleration step;

FIG. 7 is a longitudinal cross-sectional view of the variant comprising a three-way valve at the crank pin rotation step;

FIG. 8 is a longitudinal cross-sectional view of the variant comprising a three-way valve at the step of resuming the deceleration; and FIG. 9 is a longitudinal cross-sectional view of the variant comprising a three-way valve at the step of re-establishing communication between two cones of the device.

DETAILED DESCRIPTION

First Application Context of the Disclosure

Embodiments of the present disclosure are described below with reference to the figures, in the more specific context of cell therapies using blood components.

The embodiments described below relate to a device, preferably single-use, intended for an automated system that makes it possible to treat and to concentrate the stem cells without losing or altering their functionality, in particular, for the transplantation of hematopoietic progenitor stem cells.

The fraction rich in stem cells is isolated from the peripheral blood taken in the circulatory system.

In order to isolate the stem cells from the buffy coat, density-gradient products are used, such as those available under the names FICOLL and PERCOLL (trademarks). The density-gradient product is first introduced into the treatment device, followed by the introduction of whole blood, then a component of biological fluid is separated by centrifugation and collected by pipetting, for example.

Physical Description of the Device

The centrifugation device according to the present disclosure is formed by a molded part made of plastic material, in the general shape of an hourglass or bicone, comprising:

- a peripheral conical part (10) comprising, at the peripheral end thereof, a large base closed by a cover (11) and comprising a supply opening (12); and
- a central conical part (20), the central end of which is separated from a concave base (21) by a resilient membrane (22), and a connecting sleeve (30) between the base of the peripheral conical part (10) and the base of the central conical part (20).

The cover (11) of the peripheral conical part (10) comprises, at the central part thereof, a peripheral rib (13) that comes to rest on an annular seal (14) received in a peripheral groove (15) provided at the peripheral edge of the peripheral conical part (10). The peripheral rim (16) forms a hooking element in a chamber of a centrifuge (not shown).

The connecting sleeve (30) comprises two channels (31, 32) opening at the inside of the lower central conical part (20).

The first channel (31) establishes communication between the base of the peripheral conical part (10) and the central conical part (20). A first float (33) of density D1 is suitable.

The second channel (32) passes through the peripheral conical part (10) and opens outside the cover (11). It encloses a first float (34) of density D2 and a second float (35) of density D3.

The resilient membrane (22) is an elastically deformable biocompatible silicone membrane having an elasticity of approximately 450% and a thickness of between 1 and 2 millimeters, and a diameter of 50 millimeters. It ensures a toroidal peripheral edge that is enclosed in the annular grooves provided on the front part of the central conical part (20), and a closure cover.

The upper diameter of the peripheral (10) and central (20) conical parts is 50 millimeters, and the inside diameter of the communication channel is between 1 and 1.5 millimeters.

Description of a Three-Way Valve Variant

Description of the Centrifuge According to the Second Variant

Referring to FIG. 2, the centrifugation device according to this variant is also formed by a molded part made of plastic material, in the general shape of an hourglass or bicone, comprising:

- a peripheral conical part (10) closed by a cover (11) comprising a supply opening (12);
- a central conical part (20), the central end of which is separated from a concave base (21) by a resilient membrane (22); and
- a connecting sleeve (30) between the base of the peripheral conical part (10) and the base of the central conical part (20).

The connecting sleeve (30) comprises a channel (36). Channel (36) establishes communication between the base of the peripheral conical part (10) and the central conical part (20). It is provided with a crank pin that controls a three-way valve (37), which, according to its position, controls:

- the flow of fluid between the two conical parts (10, 20);
- the flow of fluid between the peripheral conical part (10) and a collection nozzle (38); and
- the closure of the channel (36).

The resilient membrane (22) is an elastically deformable biocompatible silicone membrane having an elasticity of approximately 450% and a thickness of between 1 and 2 millimeters, and a diameter of 50 millimeters. It comprises a toroidal peripheral edge (23) that is engaged between an annular groove (24) provided on the front edge of the central conical part (20) and a groove (25) formed in the concave base (21). The edge of groove (25) comprises a rib (26) that ensures the retention, by clipping, of the central conical part (20).

Functional Description

FIGS. 3 to 9 illustrate a sequence of centrifugation of a blood sample.

The blood sample is transferred from a sterile bag to the peripheral conical part (10) by a sterile tube that connects it to the filling nozzle of supply opening (12) (FIG. 3).

The device is then placed in a centrifuge, the peripheral conical part (10) being placed on the side of the center of the centrifuge, and the central conical part (20) being placed on the peripheral side. The three-way valve (37) is placed in the passage position, in order to allow the blood contained in the peripheral conical part (10) to flow toward the central conical part (20) under the effect of the centrifugal force (FIG. 4).

The centrifuge is then stopped in order to allow the different components of the blood to separate according to their density, increasingly the red blood cells, the white blood cells, the platelets and the plasma (FIG. 5).

A slow deceleration then takes place in order to raise the layer of interest to just below the separation zone. Once the layer of interest has arrived at the zone, the centrifuge is rotated at a constant centrifugation speed. The layers are thus immobilized, and the resilient membrane equalizes the pressure (FIG. 6).

The three-way valve (37) is then changed into the position for establishing communication with the collection nozzle (38) in order to allow for the collection of platelets (FIG. 7).

The centrifuge is returned to slow deceleration—the layer of interest is evacuated via the lateral outlet nozzle or collection nozzle (38).

As soon as the platelet layer is recovered, the return to constant speed is commanded (FIG. 8).

The crank pin controlling the three-way valve is then returned to the passage position. The layer of interest is isolated (FIG. 9).

The invention claimed is:

1. A device for recovering components of blood from a blood sample, the device comprising:

a first conical chamber having a first end and a second end, the first end having a first cross sectional area and the second end having a second cross sectional area narrower than the first cross sectional area;

a second conical chamber having a third end and a fourth end, the third end having a third cross sectional area and the fourth end having a fourth cross sectional area wider than the third cross sectional area, the second end adjacent and facing the third end;

a fluid pathway extending from the second end to the third end;

a duct for introducing fluid into the first conical chamber;

a flexible membrane covering an opening at the fourth end and configured to adjust component levels by elastically deforming; and a conduit comprising a valve within the conduit and configured to selectively recover at least one component of the blood from the fluid pathway.

2. The device of claim 1, wherein the valve comprises a float valve.

3. The device of claim 1, wherein the valve comprises a three-way valve and wherein the conduit further comprises an outlet nozzle.

4. The device of claim 1, further comprising a first float in the conduit and having a first predetermined density.

5. The device of claim 4, further comprising a second float in the conduit and having a second predetermined density.

6. The device of claim 5, wherein the first conical chamber further comprises a cover.

7. A method of recovering one or more components from a blood sample using the device of claim 1, the method comprising:

introducing the blood sample into the first conical chamber;

separating the one or more components from the blood sample by centrifuging the device with the introduced blood using a centrifuge; and recovering the one or more blood components through the conduit by selectively actuating the valve.

* * * * *